United States Patent
Wang et al.

(10) Patent No.: US 9,465,258 B2
(45) Date of Patent: Oct. 11, 2016

(54) DISPLAY PANEL HAVING REDUCED INFLUENCE OF IONS RELEASED FROM THE SEALANT FRAME

(71) Applicant: Au Optronics Corporation, Hsinchu (TW)

(72) Inventors: Syu-Jhe Wang, Taipei (TW); Chien-Cheng Yu, Hsinchu County (TW)

(73) Assignee: Au Optronics Corporation, Hsinchu (TW)

( * ) Notice: Subject to any disclaimer, the term of this patent is extended or adjusted under 35 U.S.C. 154(b) by 42 days.

(21) Appl. No.: 14/708,298

(22) Filed: May 11, 2015

(65) Prior Publication Data

US 2016/0161776 A1    Jun. 9, 2016

(30) Foreign Application Priority Data

Dec. 9, 2014  (TW) ............................. 103142810 A (51) Int. Cl.
| | | |
|---|---|---|
| G02F 1/1335 | (2006.01) | |
| G02F 1/1339 | (2006.01) | |
| G02F 1/1345 | (2006.01) | |
| G02F 1/1343 | (2006.01) | |
| G02F 1/1362 | (2006.01) | |
| G02F 1/1333 | (2006.01) | |

(52) U.S. Cl.
CPC ........... *G02F 1/1339* (2013.01); *G02F 1/1362* (2013.01); *G02F 1/13454* (2013.01); *G02F 1/134363* (2013.01); *G02F 2001/133388* (2013.01); *G02F 2001/134372* (2013.01); *G02F 2001/136218* (2013.01); *G02F 2201/501* (2013.01)

(58) Field of Classification Search
CPC ........... G02F 1/1335; G02F 1/133526; G02F 1/3362; G02F 2001/133531; G02F 1/133528
See application file for complete search history.

(56) References Cited

U.S. PATENT DOCUMENTS

| | | |
|---|---|---|
| 7,456,909 B2 | 11/2008 | Park |
| 7,679,693 B2 | 3/2010 | Park |
| 7,773,182 B2 | 8/2010 | Kimura et al. |
| 2006/0023135 A1 | 2/2006 | Park |
| 2009/0141205 A1 | 6/2009 | Park |
| 2013/0154979 A1 | 6/2013 | Li et al. |

FOREIGN PATENT DOCUMENTS

| | | |
|---|---|---|
| CN | 101598866 | 12/2009 |
| CN | 103676345 | 3/2014 |
| TW | 503338 | 9/2002 |
| TW | I282019 | 6/2007 |

*Primary Examiner* — Tracie Y Green
(74) *Attorney, Agent, or Firm* — Jianq Chyun IP Office (57) ABSTRACT

A display panel having a display region and a non-display region surrounding the display region is provided. The display panel includes a first substrate, a second substrate, a sealant located in the non-display region, and a display medium. The first substrate includes a plurality of scan lines and data lines, a plurality of active devices, a plurality of pixel electrodes, and a common electrode located in the display region. The active devices are electrically connected to the scan lines and the data lines. The pixel electrodes are electrically connected to the active devices. The common electrode is disposed corresponding to the pixel electrodes. The first substrate further includes a shielding electrode located in the non-display region and is electrically connected to the common electrode. The shielding electrode is located between the sealant and the common electrode and surrounds the display region.

12 Claims, 12 Drawing Sheets

DISPLAY PANEL HAVING REDUCED INFLUENCE OF IONS RELEASED FROM THE SEALANT FRAME

CROSS-REFERENCE TO RELATED APPLICATION

This application claims the priority benefit of Taiwan application serial no. 103142810, filed on Dec. 9, 2014. The entirety of the above-mentioned patent application is hereby incorporated by reference herein and made a part of this specification.

BACKGROUND OF THE INVENTION

1. Field of the Disclosure

The disclosure relates to a display panel, and more particularly, to a display panel having a shielding electrode.

2. Description of Related Art

A liquid crystal display has the advantages of, for instance, high picture quality, small volume, light weight, low-voltage drive, low power consumption, and wide range of applications, and has therefore become the mainstream next-generation display. The conventional liquid crystal display panel is formed by sealing a liquid crystal layer between a color filter substrate having a color filter layer and a thin-film transistor (TFT) array substrate via a sealant. Generally, liquid crystal molecules in an LCD panel can be driven via a vertical electric field or a transverse electric field. Examples of a display medium driven by a vertical electric field include a twisted nematic (TN)-type LCD panel and a vertical alignment (VA)-type LCD panel. Examples of a display medium driven by a transverse electric field include an in-plane switching (IPS)-type LCD panel and a fringe field switching (FFS)-type LCD panel.

However, a sealant frame readily releases ions, and an electric field effect is generated in the actuation of the ions and the driver circuit, thus causing accumulation of electric charge in the periphery of the display region. As a result, the generation of a display mura effect readily occurs.

SUMMARY OF THE INVENTION

The invention provides a display panel capable of reducing influence to a display region caused by ions released from a sealant frame, so as to increase uniformity of screen display.

The invention provides a display panel having a display region and a non-display region surrounding the display region. The display panel includes a first substrate, a second substrate, a sealant, and a display medium. The first substrate includes a plurality of scan lines and a plurality of data lines located in the display region, a plurality of active devices located in the display region and electrically connected to the scan lines and the data lines, a plurality of pixel electrodes located in the display region and electrically connected to the active devices, a common electrode located in the display region and disposed corresponding to the pixel electrodes, and a shielding electrode located in the non-display region and electrically connected to the common electrode. The second substrate is located on a side opposite to the first substrate. The sealant is located in the non-display region and located between the first substrate and the second substrate, wherein the shielding electrode is located between the sealant and the common electrode, and the shielding electrode surrounds the display region. The display medium is located between the first substrate, the second substrate, and the sealant.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
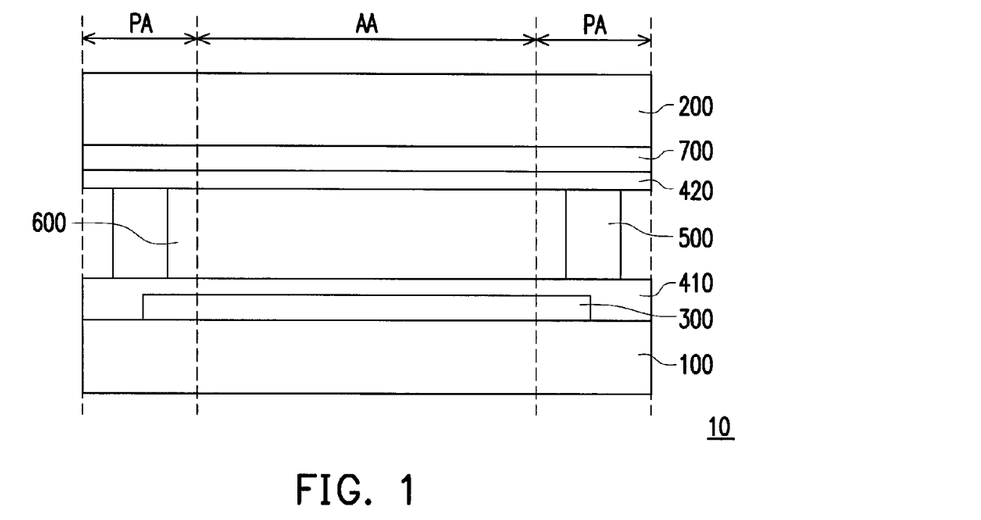
FIG. 1 is a cross-sectional schematic of a display panel according to an embodiment of the invention.

FIG. 1 is a cross-sectional schematic of a display panel according to an embodiment of the invention. A display panel 10 has a display region AA and a non-display region PA surrounding the display region AA. The display panel 10 includes a first substrate 100, a pixel array 300, a first alignment layer 410, a second alignment layer 420, a display medium 600, a sealant 500, a color filter layer 700, and a second substrate 200.

The material of the first substrate 100 can be, for instance, glass, quartz, organic polymer, or metal. The pixel array 300 is disposed on the first substrate 100, and the pixel array 300 is described in detail later.

The second substrate 200 is disposed on a side opposite to the first substrate 100. The material of the second substrate 200 can be, for instance, glass, quartz, or organic polymer. The color filter layer 700 is further disposed on the second substrate 200, wherein the color filter layer 700 includes a plurality of color filter patterns. The color filter patterns can respectively be red, green, and blue color filter patterns, but the invention is not limited thereto.

The sealant 500 is located between the first substrate 100 and the second substrate 200, and is located in the non-display region PA, such that the first substrate 100 and the second substrate 200 are grouped together. From another perspective, the sealant 500 is disposed surrounding the display region AA. The material of the sealant 500 is, for instance, a thermosetting adhesive material, a light-curing adhesive material, or other suitable materials. In addition, the display panel 10 can optionally further include a spacer located inside the sealant 400, and the material of the spacer is, for instance, spherical glass, columnar glass, or photo-spacer, but the invention is not limited thereto.

The display medium 600 is sealed between the first substrate 100, the second substrate 200, and the sealant 500. In other words, the display medium 600 is disposed in the accommodation space between the first substrate 100, the second substrate 200, and the sealant 500. The display medium 600 can include a liquid crystal molecule, an electrophoretic display medium, or other applicable media.

The first alignment layer 410 covers the pixel array 300 and is disposed between the pixel array 300 and the sealant 500. Moreover, the first alignment layer 410 covers the pixel array 300 so as to perform alignment function on the display medium 600. In the present embodiment, the first alignment layer 410 is located in both the display region AA and the non-display region PA. Moreover, the second alignment layer 420 is located on the second substrate 200 and covers the color filter layer 700, and the second alignment layer 420 is disposed between the color filter layer 700 and the sealant 500. Moreover, the second alignment layer 420 covers the color filter layer 700 so as to perform alignment function on the display medium 600. The first alignment layer 410 and the second alignment layer 420 are, for instance, organic materials, and perform alignment on the display medium 600 via a contact or non-contact alignment method.

Figure 2A:
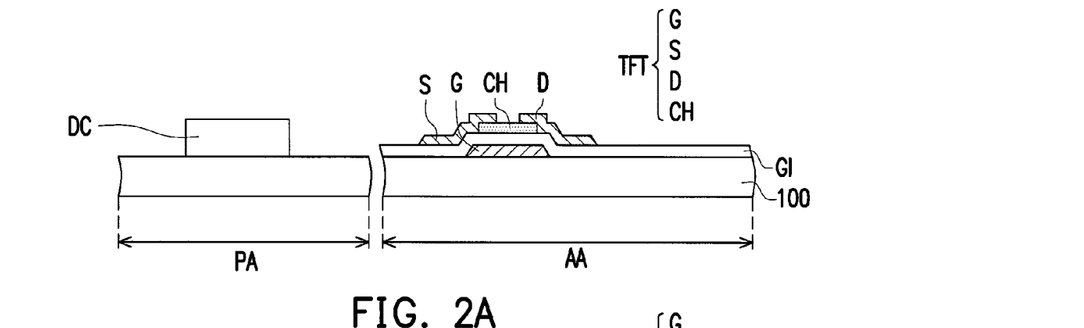
FIGS. 2A to 2F are cross-sectional schematics of the manufacturing process of a display panel according to an embodiment of the invention.

FIGS. 2A to 2F are cross-sectional schematics of the manufacturing process of the display panel of FIG. 1. FIG. 3 is a schematic of devices on the first substrate of the display panel of FIG. 1. Referring to FIG. 1, FIG. 2A, and FIG. 3, first, a first substrate 100 is provided, a pixel array 300 is formed in a display region AA of the first substrate 100, and a peripheral circuit DC and a driving apparatus IC are formed in a non-display region PA of the first substrate 100.

More specifically, the step of forming the pixel array 300 on the first substrate 100 includes forming a plurality of active devices TFT inside the display region AA. The manufacturing steps of the active devices TFT include first forming a gate G on the first substrate 100 and then forming a gate insulation layer GI covering the gate G on the gate G. The material of the gate insulation layer GI is, for instance, an inorganic dielectric material (such as silicon oxide, silicon nitride, silicon oxynitride, or stacked layers of at least two materials thereof), an organic dielectric material, or a combination of the organic and inorganic dielectric materials, but the invention is not limited thereto. Next, a channel layer CH is formed on the gate insulation layer GI, and a source S and a drain D are formed on the channel layer CH. The gate G, the source S, and the drain D are, for instance, metal materials. Moreover, the material of the channel layer CH can be selected to be amorphous silicon, polysilicon, or an oxide semiconductor material (such as indium-gallium-zinc oxide (IGZO), zinc oxide (ZnO), tin oxide (SnO), indium-zinc oxide (IZO), gallium-zinc oxide (GZO), zinc-tin oxide (ZTO), or indium-tin oxide (ITO)), but the invention is not limited thereto.

The gate G, the source S, the drain D, and the channel layer CH form the active devices TFT. The gate G is electrically connected to the scan lines SL and the source S is electrically connected to the data lines DL. The active devices TFT of the present embodiment are exemplified as bottom gate-type thin-film transistors, but the invention is not limited thereto, and the active devices TFT can also be top gate-type thin film transistors. The scan lines SL are located in the display region AA and are extended to the non-display region PA and electrically connected to the peripheral circuit DC located in the non-display region PA, and the data lines DL are located in the display region AA and are extended to the non-display region PA and electrically connected to the driving apparatus IC located in the non-display region PA.

Figure 2B:
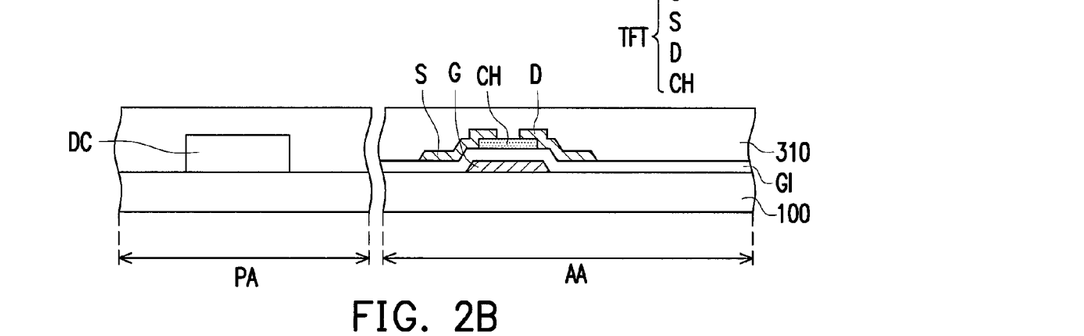
Figure 3:
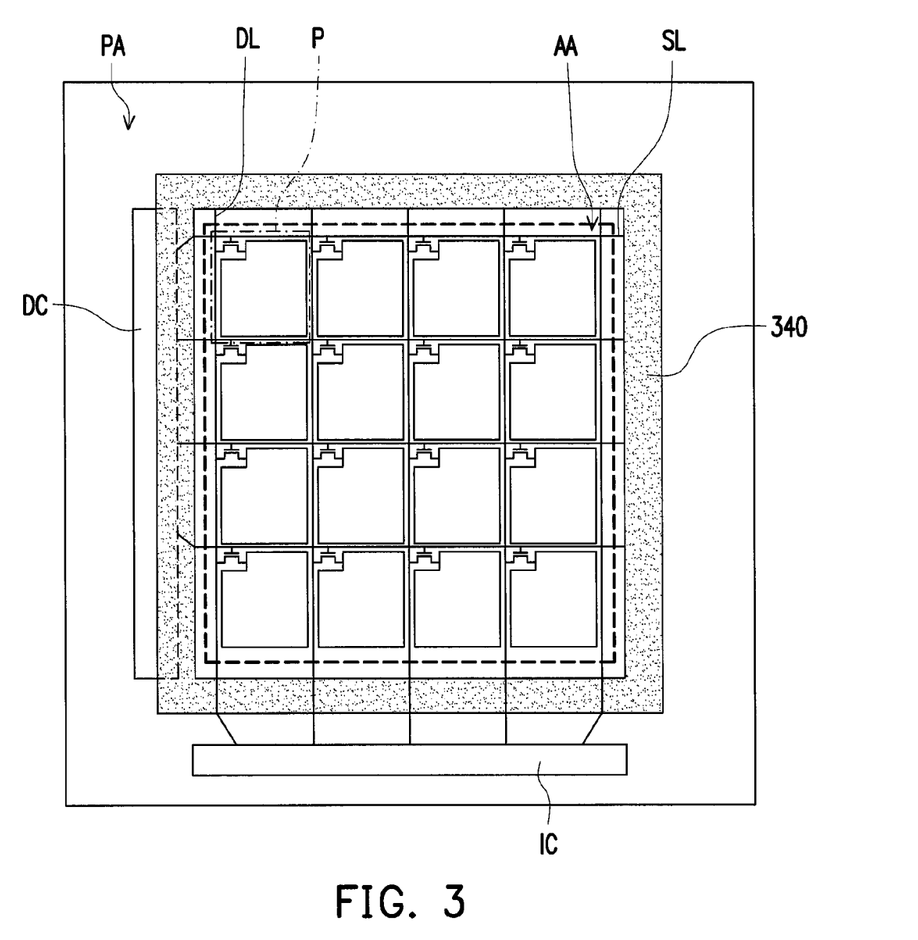
FIG. 3 is a top schematic of devices on the first substrate in the display panel of FIG. 1.

Referring to FIG. 2B, a first insulation layer 310 is formed on the first substrate 100 to cover the peripheral circuit DC and the active devices TFT. The material of the first insulation layer 310 contains an inorganic material (such as: silicon oxide, silicon nitride, silicon oxynitride, other suitable materials, or stacked layers of at least two materials thereof), an organic material, other suitable materials, or a combination thereof.

Figure 2C:
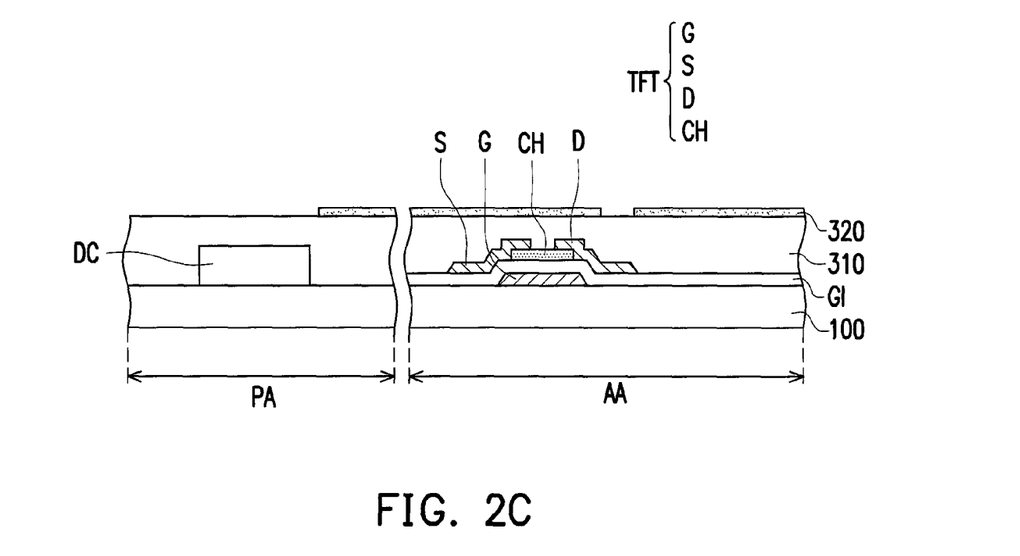

Referring to FIG. 2C, a common electrode 320 is formed on the first insulation layer 310, and the common electrode 320 is extended from the display region AA to the non-display region PA. The common electrode 320 is electrically connected to a common voltage (Vcom). The common electrode 320 can be a transmissive electrode, a reflective electrode, or a semi-transmissive, semi-reflective electrode. The material of the transmissive electrode includes a metal oxide such as ITO, IZO, aluminum-tin oxide, aluminum-zinc oxide, IGZO, other suitable oxides, or stacked layers of at least two of the above. The material of the reflective electrode includes a metal material having high reflectance, but the invention is not limited thereto.

Figure 2D:
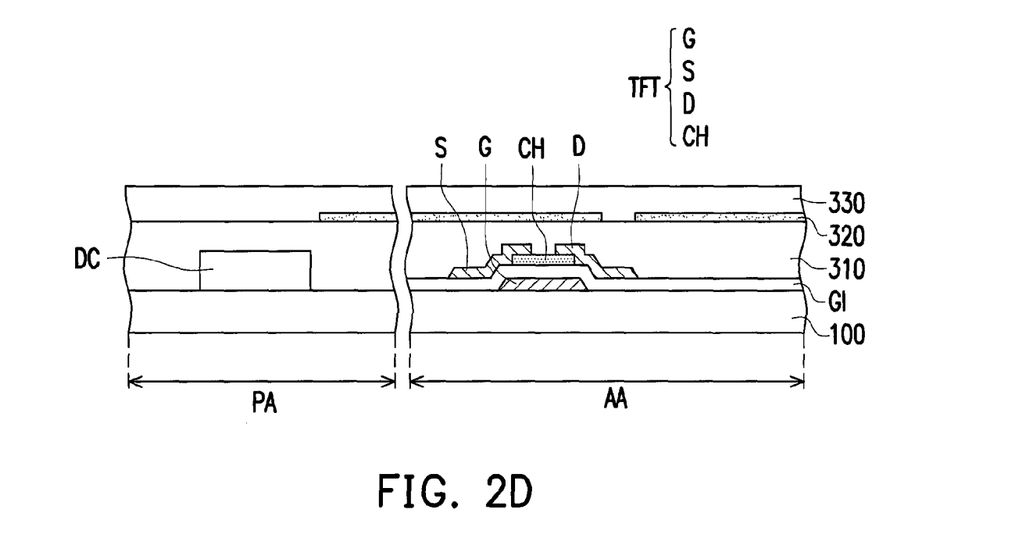

Next, referring to FIG. 2D, a second insulation layer 330 is formed on the common electrode 320 to cover the common electrode 320. The material of the second insulation layer 330 can be the same or different as the material of the first insulation layer, and the material of the second insulation layer 330 is not particularly limited in the invention.

Figure 2E:
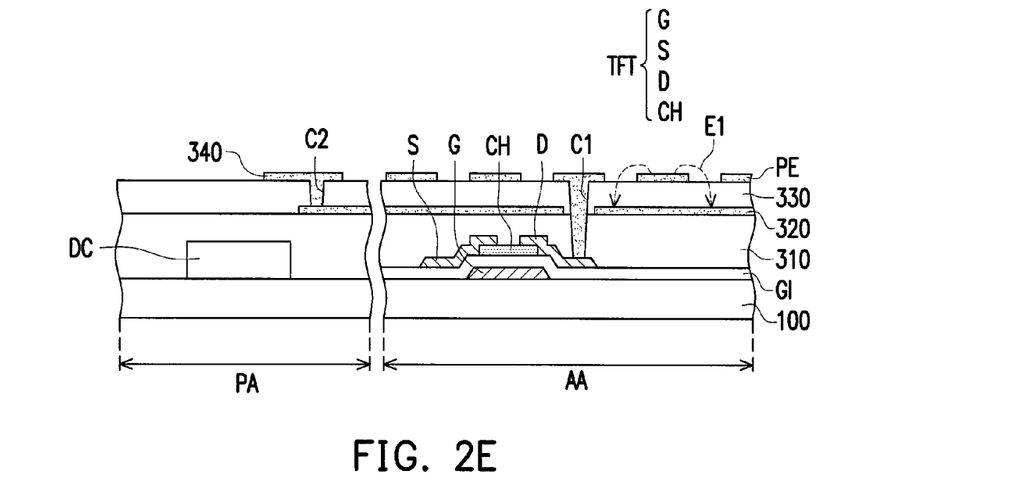

Referring to FIG. 2E, after the second insulation layer 330 is formed, an electrode material (not shown) is formed on the second insulation layer 330, and then the electrode material is patterned to form pixel electrodes PE located inside the display region AA and a shielding electrode 340 located inside the non-display region PA. In other words, the pixel electrodes PE located inside the display region AA and the shielding electrode 340 located inside the non-display region PA belong to the same film layer. The pixel electrodes PE and the shielding electrode 340 can be transmissive pixel electrodes, reflective pixel electrodes, or semi-transmissive, semi-reflective pixel electrodes. The material of the transmissive pixel electrodes includes a metal oxide such as ITO, IZO, aluminum-tin oxide, aluminum-zinc oxide, IGZO, other suitable oxides, or stacked layers of at least two of the above. The material of the reflective pixel electrodes includes a metal material having high reflectance, but the invention is not limited thereto.

Referring to both FIG. 2E and FIG. 3, in the present embodiment, the shielding electrode 340 is partially overlapped with the peripheral circuit DC, and is electrically connected to the common electrode 320 located in the non-display region PA via a second contact C2.

Figure 4:
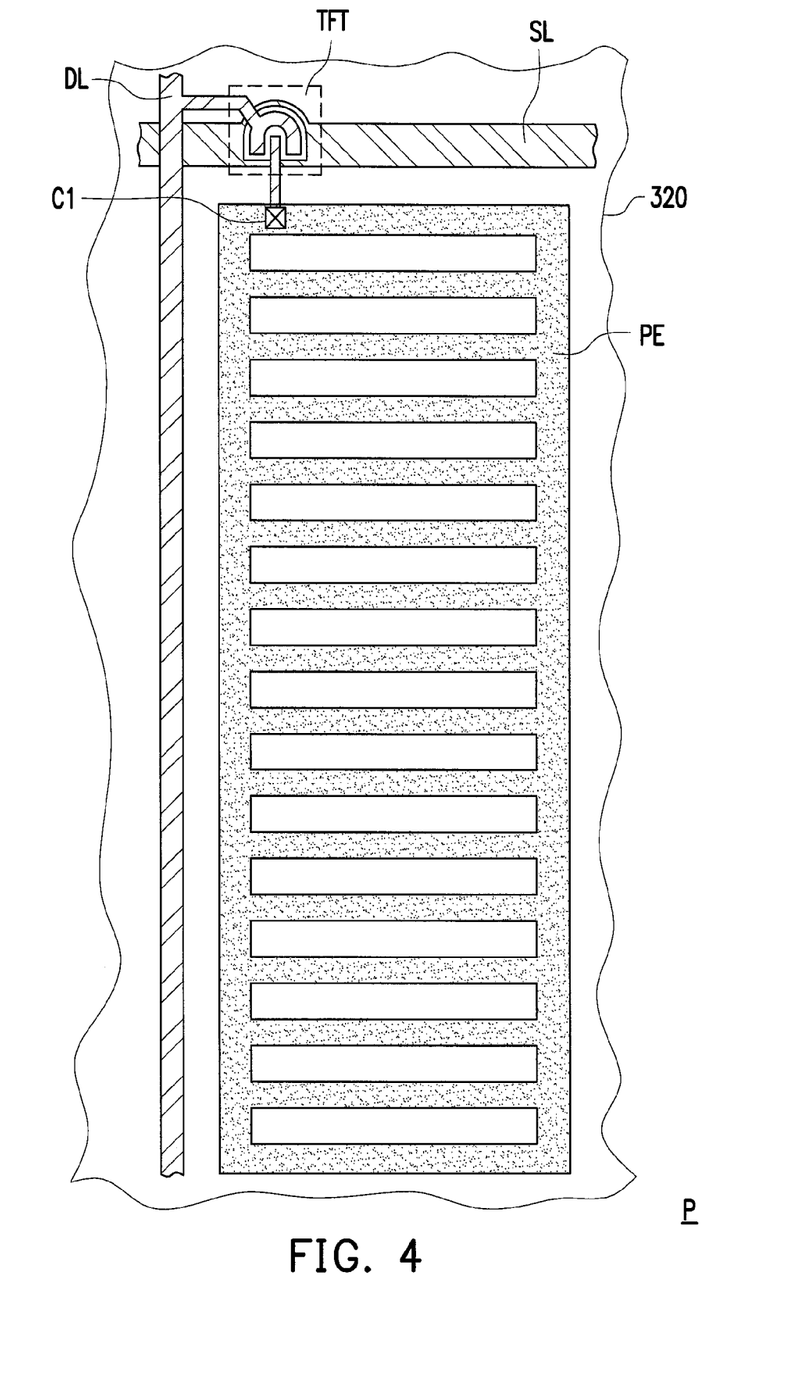
FIG. 4 is a top view of a pixel unit in the pixel array of FIG. 3.

Moreover, after the pixel electrodes PE are formed, pixel units P located in the display region AA are as shown in FIG. 4. Referring to both FIG. 2E and FIG. 4, the pixel electrodes PE are electrically connected to the drain D in the active devices TFT by passing through the first contact C1 of the first insulation layer 310 and the second insulation layer 330. When driving is performed on the pixel units P, a fringe field E1 is formed between the pixel electrodes PE and the common electrode 320. Via the fringe field E1, liquid crystal molecules in the display medium layer 600 (as shown in FIG. 1) can be driven to rotate, so as to achieve the effect of display. In other words, the display panel 10 in the present embodiment is a fringe field switching (FFS)-type liquid crystal display panel.

Figure 2F:
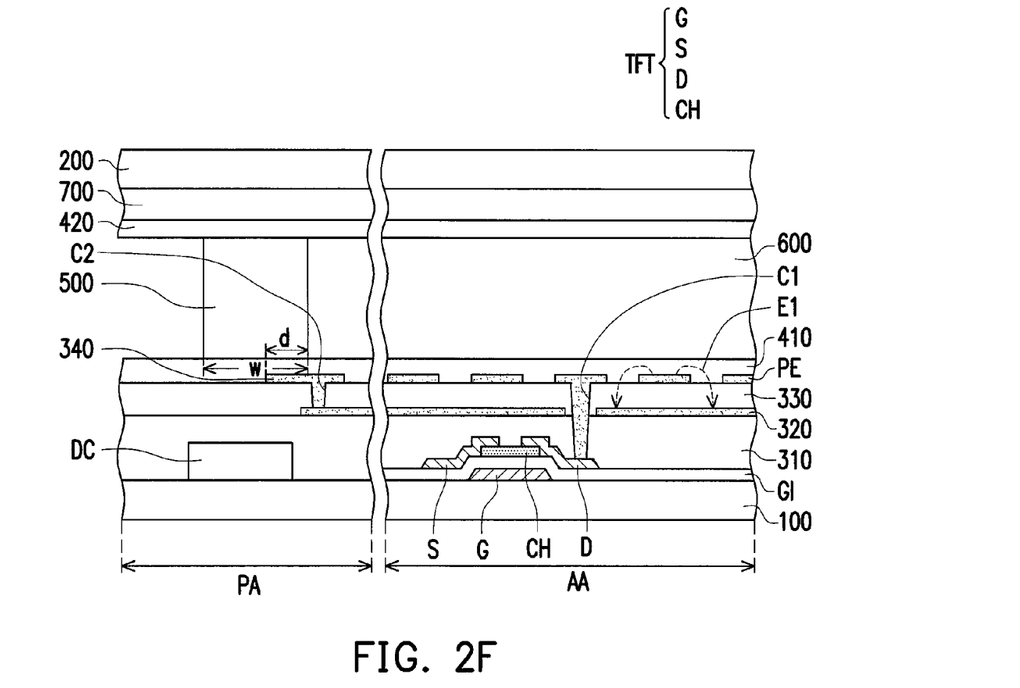

Referring further to FIG. 2F, a first alignment layer 410 is formed on the pixel electrodes PE and the shielding electrode 340. The first alignment layer 410 is located in the display region AA and the non-display region PA, and covers the pixel electrodes PE and the shielding electrode 340. Then, the second substrate 200 provided with the color filter layer 700 and the second alignment layer 420 and the first substrate 100 including devices such as the active devices TFT, the common electrode 320, the pixel electrodes PE, the shielding electrode 340, and the first alignment layer 410 are grouped together via the sealant 500. The sealant 50 is located in the non-display region PA and is overlappingly disposed with the shielding electrode 340, such that the first alignment layer 410 is located between the sealant 500 and the shielding electrode 340. It should be mentioned that, the width of the sealant is W, an overlapping width between the shielding electrode 340 and the sealant 500 is d, and d is greater than or equal to W/3. Moreover, a display medium 600 is further injected in the space formed by the sealant 500, the first alignment layer 410, and the second alignment layer 420.

Accordingly, in the present embodiment, since the shielding electrode 340, the sealant 500, and the peripheral circuit DC are overlappingly disposed, and since the shielding electrode 340 is electrically conductive with the common electrode 320 connected to the common voltage (Vcom), ions released by the sealant 500 can be moved to the common electrode 320 via the shielding electrode 340 to prevent the accumulation of electric charge of the ions and the resulting effect thereof on quality of display. Moreover, the shielding electrode 340 is located between the peripheral circuit DC and the sealant 500, and can also shield electrical influence generated by the peripheral circuit DC, so as to reduce excessive accumulation of the ions released by the sealant 500 in the region adjacent to the peripheral circuit DC.

Figure 5A:
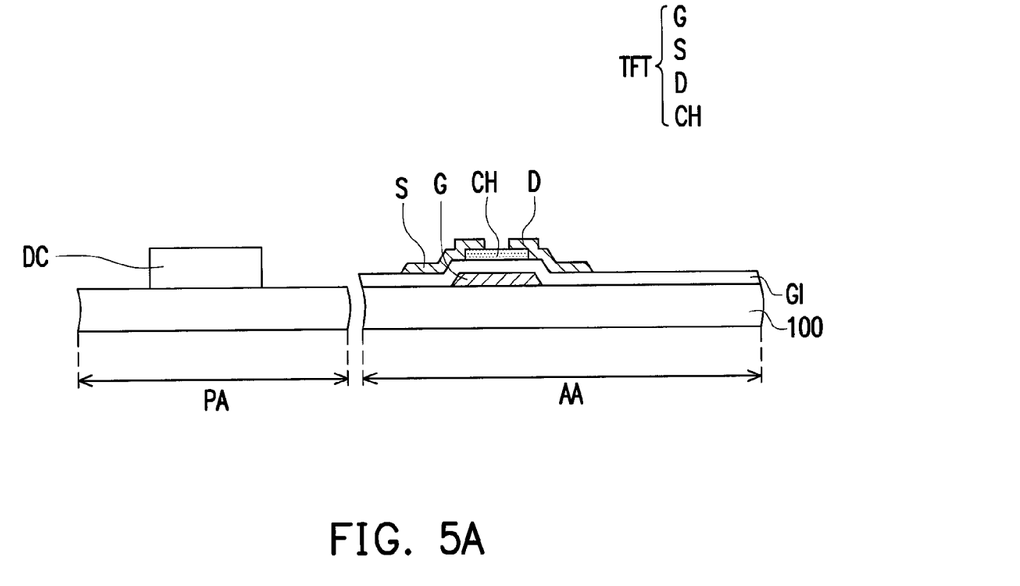
FIGS. 5A to 5F are cross-sectional schematics of the manufacturing process of a display panel according to another embodiment of the invention.
Figure 5B:
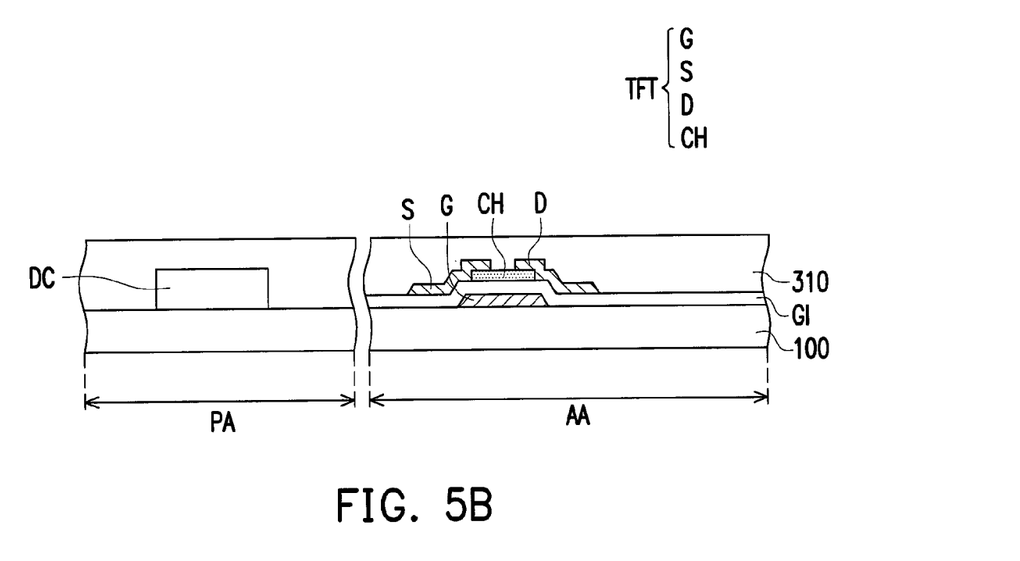
Figure 5C:
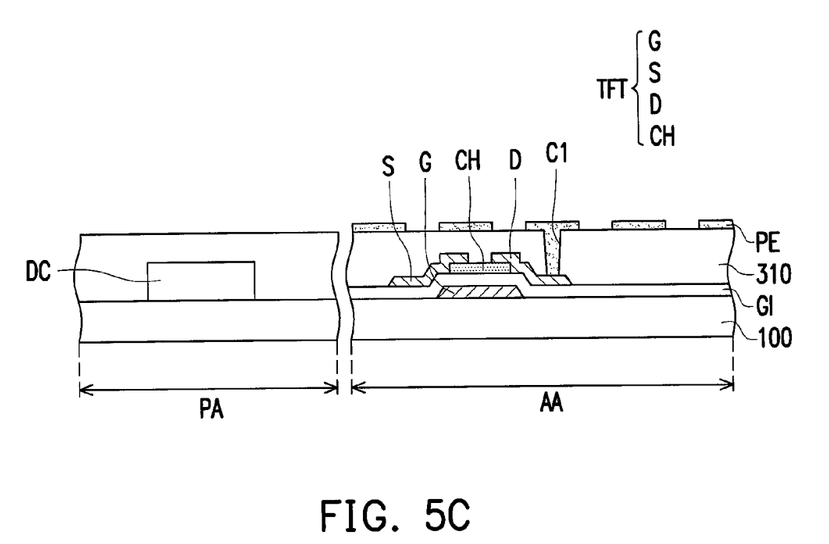
Figure 5D:
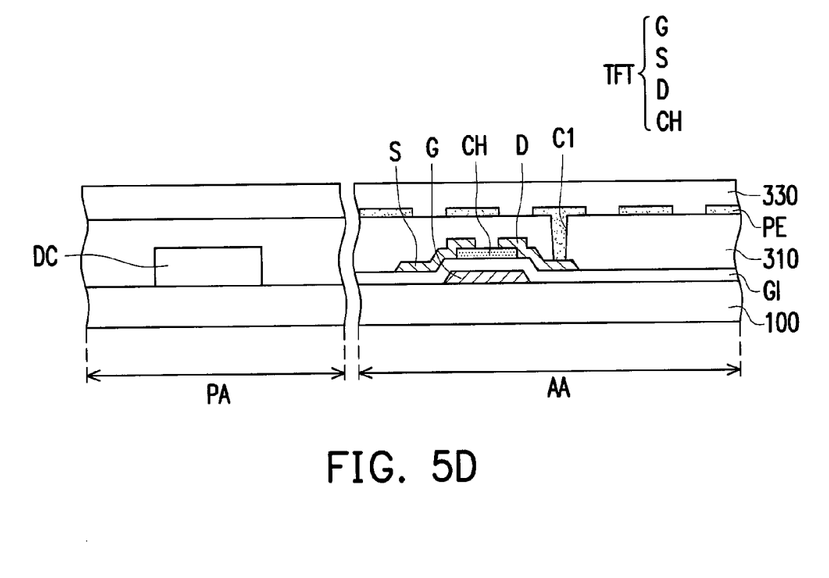
Figure 5E:
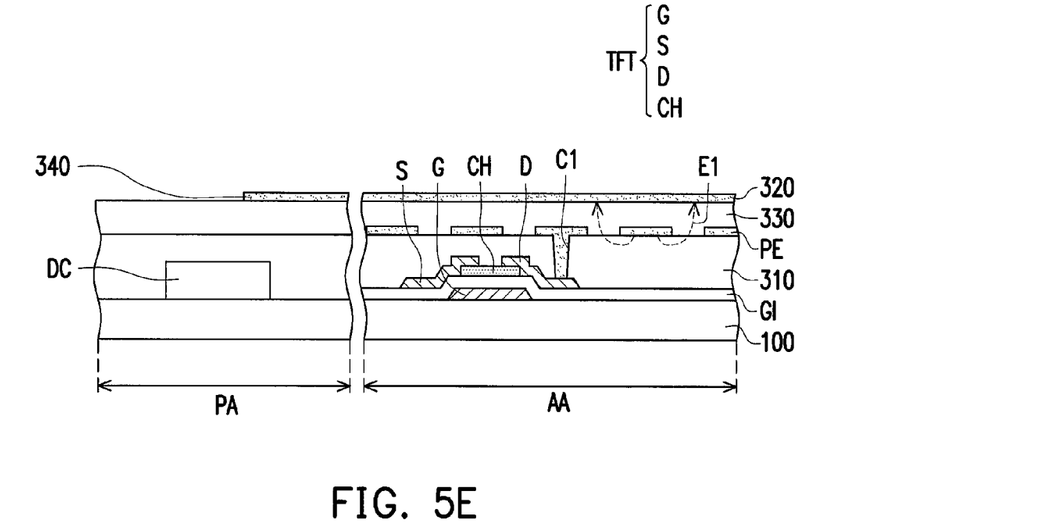

FIGS. 5A to 5F are cross-sectional schematics of the manufacturing process of a display panel according to another embodiment of the invention. The manufacturing process of the display panel of the present embodiment is similar to that of the display panel of FIGS. 2A to 2E, and therefore the same devices are represented by the same reference numerals. The steps of FIG. 5A and FIG. 5B are the same as the steps of FIG. 2A and FIG. 2B and are therefore not repeated herein. The difference between the present embodiment and the embodiment of FIGS. 2A to 2E is that, in the present embodiment, the pixel electrodes PE are first formed, and then the common electrode 320 and the shielding electrode 340 are formed, as shown in FIG. 5C to FIG. 5E. Referring to FIG. 5C, in the present embodiment, the pixel electrodes PE are electrically connected to the drain D of the active devices TFT by passing through the contact C1 of the first insulation layer 310.

Referring to FIG. 5D, a second insulation layer 330 is formed on the pixel electrodes PE. Referring to FIG. 5E, a common electrode 320 and a shielding electrode 340 are formed on the second insulation layer 330. In other words, in the present embodiment, the common electrode 320 located inside the display region AA and the shielding electrode 340 located inside the non-display region PA belong to the same film layer. Similarly, when driving is performed on the pixel units P, a fringe field E1 is formed between the pixel electrodes PE and the common electrode 320.

Figure 5F:
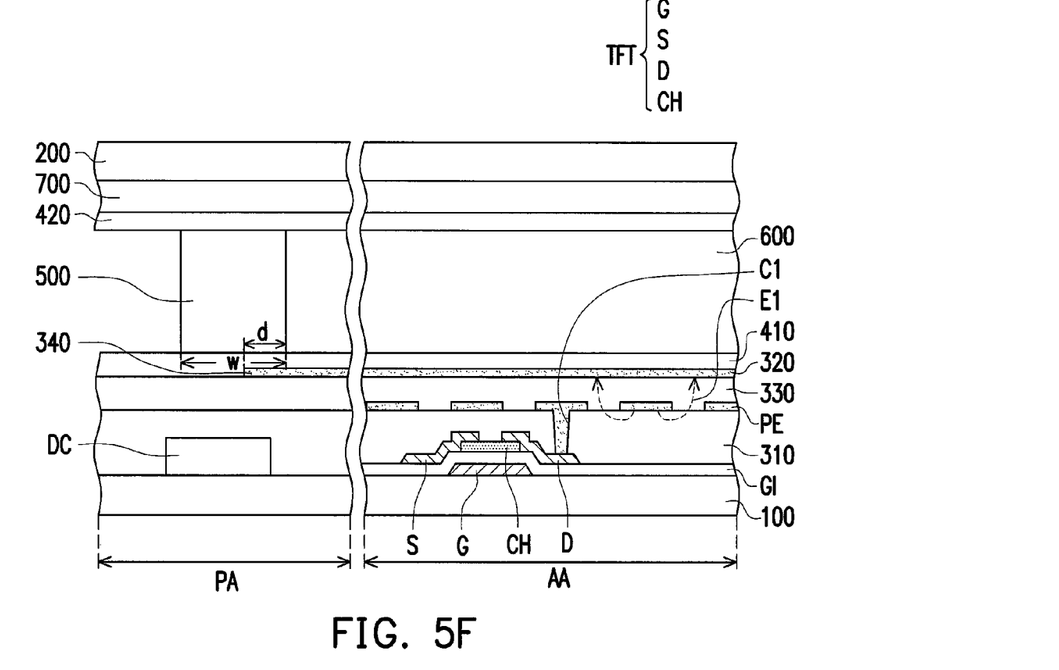

Referring to FIG. 5F, the step is similar to FIG. 2F, that is, a first alignment layer 410 is formed; then, the structure formed above and the second substrate 200 on which the color filter layer 700 and the second alignment layer 400 are formed are grouped together via the sealant 500. After grouping, the overlapping width d of the sealant 500 and the shielding electrode 340 is greater than or equal to W/3, wherein W is the width of the sealant 500.

Similarly, in the present embodiment, the shielding electrode 340, the sealant 500, and the peripheral circuit DC are overlappingly disposed, such that ions released by the sealant 500 can be moved to the common electrode 320 via the shielding electrode 340, so as to prevent the accumulation of electric charge of the ions and the resulting effect thereof on quality of display. Moreover, the shielding electrode 340 is located between the peripheral circuit DC and the sealant 500, and can also shield electrical influence generated by the peripheral circuit DC, so as to reduce excessive accumulation of the ions released by the sealant 500 in the region adjacent to the peripheral circuit DC.

Figure 6A:
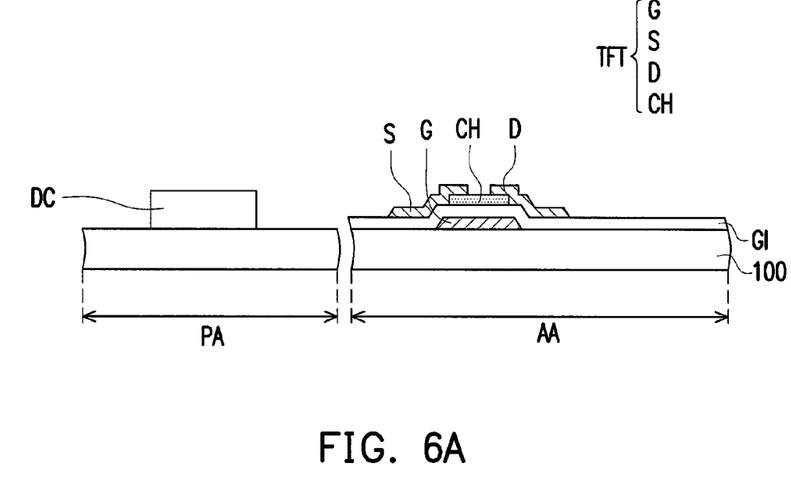
FIGS. 6A to 6D are cross-sectional schematics of the manufacturing process of a display panel according to another embodiment of the invention.
Figure 6B:
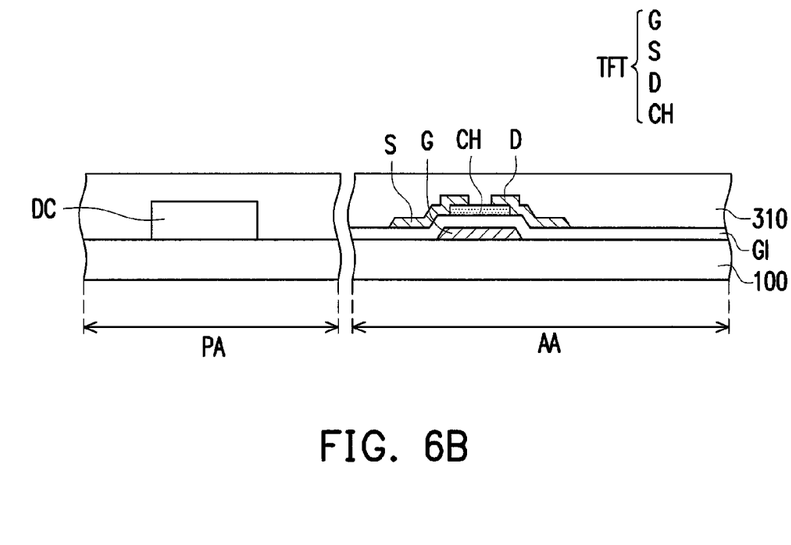
Figure 6C:
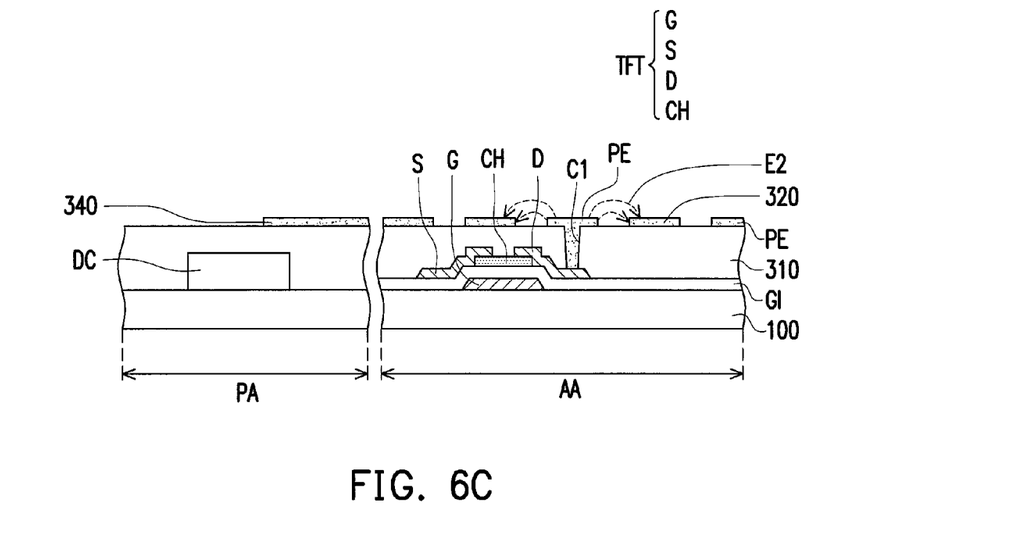

FIGS. 6A to 6D are cross-sectional schematics of the manufacturing process of a display panel according to another embodiment of the invention. The display panel of the present embodiment is similar to the display panel of FIGS. 2A to 2E, and therefore the same devices are represented by the same reference numerals. The steps of FIG. 6A and FIG. 6B are the same as the steps of FIG. 2A and FIG. 2B and are therefore not repeated herein. The difference between the present embodiment and the embodiment of FIGS. 2A to 2E is that, in the present embodiment, the common electrode 320 is a patterned electrode layer, and the pixel electrodes PE, the common electrode 320, and the shielding electrode 340 belong to the same film layer. Then, referring to FIG. 6C, an electrode material (not shown) is formed on the first insulation layer 310, and the electrode material is patterned so as to form the pixel electrodes PE and the common electrode 320 located inside the display region AA and the shielding electrode 340 located in the non-display region PA at the same time. The formed pixel unit is as shown in FIG. 7. As shown in FIG. 6C and FIG. 7, the pixel electrodes PE and the common electrode 320 are respectively a comb structure and are staggeringly disposed with one another. The pixel electrodes PE are electrically connected to the drain D of the active devices TFT by passing through the first contact C1 of the first insulation layer 310, and the common electrode 320 is electrically connected to a common electrode line CL via a third contact C3 (as shown in FIG. 7). In the present embodiment, the common electrode line CL and the scan lines SL are the same film layer, but the invention is not limited thereto. Moreover, the shielding electrode 340 located in the non-display region PA is substantially formed by the extension of the common electrode 320 from the display region AA to the non-display region PA.

In the present embodiment, when driving is performed on the pixel units P, a transverse electric field E2 is formed between the pixel electrodes PE and the common electrode 320. Via the transverse electric field E2, liquid crystal molecules in the display medium layer 600 can be driven to rotate, so as to achieve the effect of display. In other words, the display adopting the pixel units in the present embodiment is an in-plane switching (IPS)-type liquid crystal display panel.

Figure 6D:
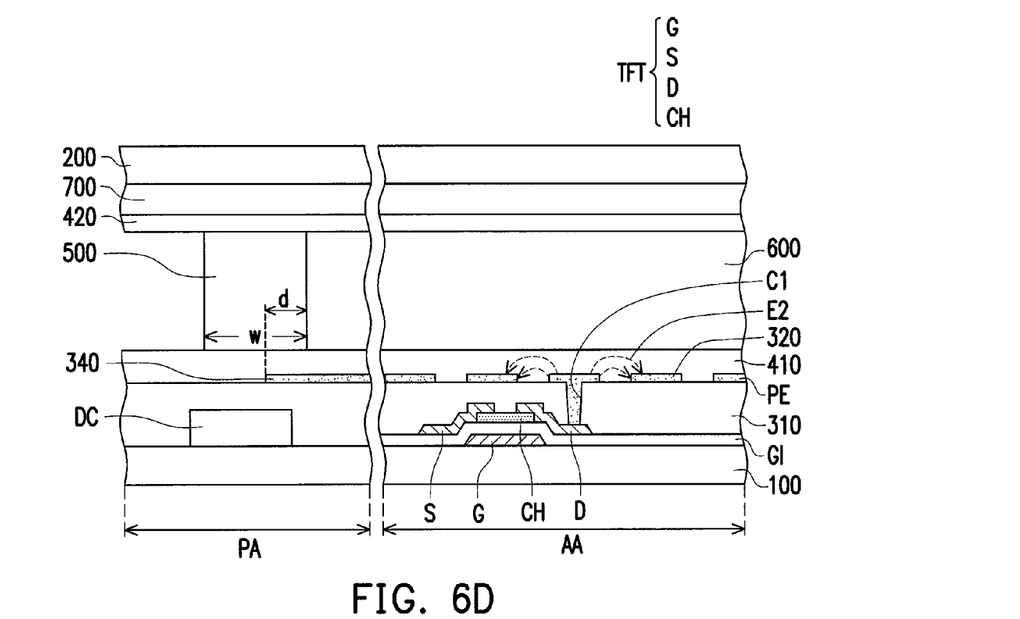
Figure 7:
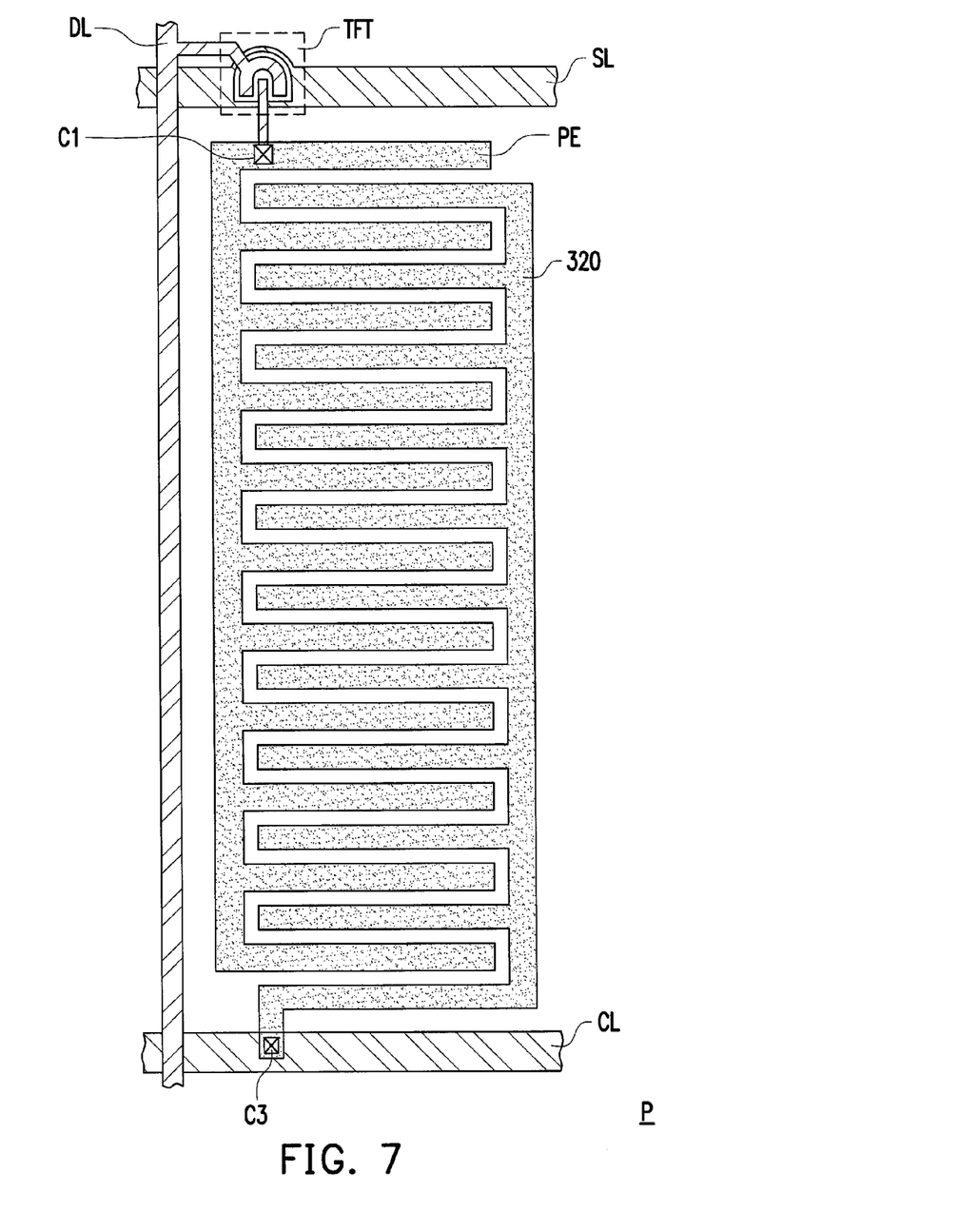
FIG. 7 is a top schematic of a pixel unit according to another embodiment of the invention.

Referring to FIG. 6D, the step is similar to FIG. 2F, that is, a first alignment layer 410 is formed; then, the structure formed above and the second substrate 200 on which the color filter layer 700 and the second alignment layer 400 are formed are grouped together via the sealant 500. After grouping, the overlapping width d of the sealant 500 and the shielding electrode 340 is greater than or equal to W/3, wherein W is the width of the sealant 500.

Similarly, in the present embodiment, the shielding electrode 340, the sealant 500, and the peripheral circuit DC are overlappingly disposed, such that ions released by the sealant 500 can be moved to the common electrode 320 via the shielding electrode 340, so as to prevent the accumulation of electric charge of the ions and the resulting effect thereof on quality of display. Moreover, the shielding electrode 340 is located between the peripheral circuit DC and the sealant 500, and can also shield electrical influence generated by the peripheral circuit DC, so as to reduce excessive accumulation of the ions released by the sealant 500 in the region adjacent to the peripheral circuit DC.

Figure 8:
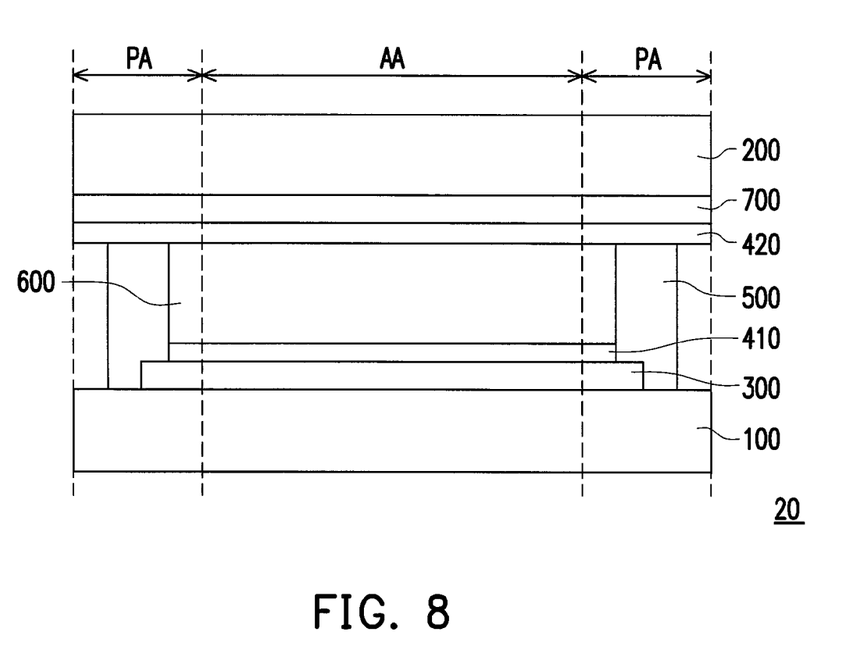
FIG. 8 is a cross-sectional schematic of a display panel according to another embodiment of the invention.

FIG. 8 is a cross-sectional schematic of a display panel according to another embodiment of the invention. A display panel 20 of the present embodiment is similar to the embodiment of FIG. 1, and therefore the same devices are represented by the same reference numerals and are not repeated herein. The difference between the present embodiment and the embodiment of FIG. 1 is that the first alignment layer 410 of the present embodiment is not extended outside of the region the sealant 500 is in, such that the sealant 500 is in contact with the edge of the pixel array 300. In other words, in the present embodiment, since the shielding electrode 340 is located in the non-display region PA and located in the edge of the pixel array 300, the sealant 500 is in contact with the shielding electrode 340.

In the present embodiment, since the sealant 500 is in direct contact with the shielding electrode 340, ions released by the sealant 500 can be more rapidly and effectively moved to the common electrode in the pixel array 300, so as to prevent the accumulation of electric charge and the resulting effect thereof on quality of display.

Based on the above, the invention provides a shielding electrode located in the non-display region and overlapped with the sealant and the peripheral circuit. Since the shielding electrode is located on the uppermost layer of the side of the active devices and is overlapped with the driver circuit and the sealant frame, an electric field effect generated by the peripheral circuit and ions can be reduced and electric charge can be rapidly released. Therefore, electric charge accumulated in the periphery of the display region can be reduced, so as to increase uniformity of screen display.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A display panel having a display region and a non-display region surrounding the display region, comprising:
    a first substrate, comprising:
        a plurality of scan lines and a plurality of data lines located in the display region;
        a plurality of active devices located in the display region and electrically connected to the scan lines and the data lines;
        a plurality of pixel electrodes located in the display region and electrically connected to the active devices;
        a common electrode located in the display region and disposed corresponding to the pixel electrodes; and
        a shielding electrode located in the non-display region and electrically connected to the common electrode;
    a second substrate disposed on a side opposite to the first substrate;
    a sealant located in the non-display region and located between the first substrate and the second substrate, wherein the shielding electrode is located between the sealant and the common electrode, and the shielding electrode surrounds the display region; and
    a display medium located between the first substrate, the second substrate, and the sealant.

2. The display panel of claim 1, further comprising a peripheral circuit located in the non-display region of the first substrate, wherein the shielding electrode is located between the peripheral circuit and the sealant.

3. The display panel of claim 1, wherein the sealant and the shielding electrode are overlappingly disposed.

4. The display panel of claim 3, wherein a width of the sealant is W, and an overlap width between the sealant and the shielding electrode is greater than or equal to W/3.

5. The display panel of claim 1, further comprising an alignment layer located in the display region and the non-display region and covering the pixel electrodes and the shielding electrode, wherein the alignment layer is sandwiched between the sealant and the shielding electrode.

6. The display panel of claim 1, further comprising an alignment layer located in the display region and covering the pixel electrodes, wherein the sealant is in contact with the shielding electrode.

7. The display panel of claim 1, further comprising an insulation layer located between the pixel electrodes and the common electrode, wherein the shielding electrode is electrically connected to the common electrode via a contact.

8. The display panel of claim 7, wherein the pixel electrodes are located on the insulation layer, the insulation layer covers the common electrode, and the shielding electrode is located on the insulation layer.

9. The display panel of claim 8, wherein the shielding electrode and the pixel electrodes belong to the same film layer.

10. The display panel of claim 1, further comprising an insulation layer located between the pixel electrodes and the common electrode, wherein the shielding electrode and the common electrode are located on the insulation layer.

11. The display panel of claim 1, wherein the common electrode is an unpatterned electrode layer, and a fringe field is between the pixel electrodes and the common electrode.

12. The display panel of claim 1, wherein the common electrode is a patterned electrode layer, and a transverse electric field is between the pixel electrodes and the common electrode.

* * * * *